Feb. 4, 1969        D. L. SHELTON        3,425,496

VIBRATING TILLAGE IMPLEMENT

Filed Nov. 16, 1964        Sheet _1_ of 3

DOTHAN L. SHELTON
INVENTOR.

BY
Atty.

DOTHAN L. SHELTON
INVENTOR.

DOTHAN L. SHELTON
INVENTOR.

United States Patent Office 3,425,496
Patented Feb. 4, 1969

3,425,496
VIBRATING TILLAGE IMPLEMENT
Dothan L. Shelton, 2100 S. Polk St.,
Amarillo, Tex. 79109
Filed Nov. 16, 1964, Ser. No. 411,330
U.S. Cl. 172—40                                5 Claims
Int. Cl. A01b 39/10

ABSTRACT OF THE DISCLOSURE

A tool bar carrying plows is vibrated by two eccentric weights rotating in opposite directions, one eccentric weight near each end of the tool bar. The weights are timed so that one thrusts forward as the other thrusts to the rear, thus producing a side-to-side rotation about the hitch means. A third eccentric weight may be optionally attached about a shaft parallel to the direction of draft.

This invention relates to earth tillage implements and more particularly to that class of such implements as are provided with power driven oscillating or vibrating apparatus for the purpose of inducing vibrations in the tools points in order to increase their effectiveness in tillage operations and to facilititate their movement through the ground.

Implements of this kind have been designed wherein the oscillating mechanism is centrally located in relation to a laterally extending tool bar and consists of an eccentrically mounted weight rotated by power means at a speed calculated to set up vibrations in the tool bar, the eccentric weight being rotated on an axis parallel to the direction of draft which is at right angles to the tool bar. In operation the tool bar is caused to describe a rapid rotary vibrating or oscillating motion which is imparted to the tool points for the purpose of breaking up the ground and reducing the power required to move the tool through the ground.

It has been found that the rotation of a single eccentric of sufficient weight and at the required speed tends to produce an overbalancing side thrust or torque in the frame of the implement on the side of upward rotation of the eccentric, effective to cause the implement to tilt or list so that one end of the tool bar will ride higher in relation to the ground than the other. This condition is very undersirable in that with a long tool bar the tillage tools carried on one end will run at a lesser depth by several inches than those on the opposite end of the tool bar.

Another difficulty encountered in this type of implement is that a greater amount of force is required to vibrate or oscillate a long tool bar from a central position, the power requirement being increased in direct ratio to the extension of the tool bar outwardly from the center of oscillation. This increase of power requires heavier construction of the implement in order to withstand the additional strain induced by the increased power requirement.

These difficulties are overcome in my invention by using two eccentrically weighted rotors spaced toward the outer ends of the tool bar and rotated on an axis parallel to the tool bar. These eccentrics may be rotated in opposite directions, or in the same direction, depending on the action desired. In this way the forces generated by the oscillators are imparted to the tool bar at relatively widely spaced points so as to reduce the force requirements as well as the stresses imparted to the frame structure. If lateral oscillation is desired a third eccentric rotor may be spaced centrally of the tool bar to rotate on an axis parallel to the direction of draft and geared to produce whatever action is desired.

It is an object of this invention to provide a tillage implement having an oscillating tool bar designed to maintain a relatively horizontal position while in operation.

It is another object of this invention to provide improved oscillation means that will reduce the stresses imparted to the frame members of the implement.

It is also an object to provide an improved tillage implement having oscillation means in close proximity to the tool points thereby reducing the force requirements for oscillation.

It is also an object to provide a single tool bar implement adaptable to a wide range of uses.

It is another object of this invention to provide a tillage implement capable of performing multiple tillage operations such as subsoiling and listing, subsoiling and mulching, fertilizer injection and furrowing, and such like combinations of tillage with only one passage of the implement over the ground being tilled.

It is a still further object to provide a ground tillage implement capable of producing surface contours in perfect register with related subsoil furrows with a single passage of the implement over the ground.

Still further objects are to achieve the above with a device that is sturdy, compact, durable, simple, versatile, and reliable, yet inexpensive and easy to manufacture and operate.

Still further objects are to achieve the above with a method that is rapid, inexpensive, and does not require skilled people to operate.

The novel construction and combination of parts comprising this invention along with other objects, advantages and uses will appear from a reading of the following description and appended claims, and reference to the accompanying drawings in which:

FIG. 4 is a side elevation of an eccentrically weighted wheel or rotor used in the oscillation apparatus.

Figure 1:
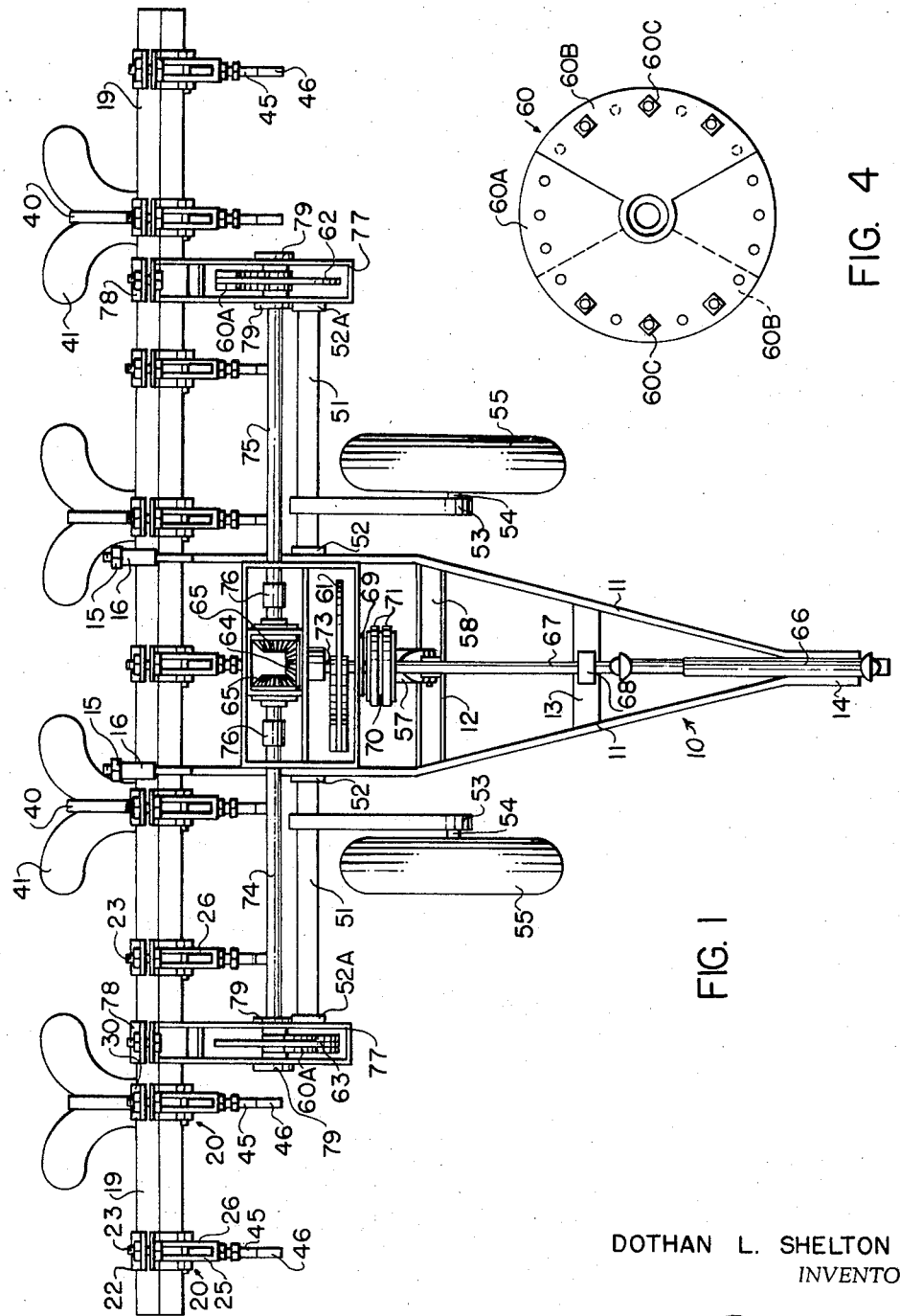
FIG. 1 is a plan view of a tillage implement showing an embodiment of my invention.
Figure 2:
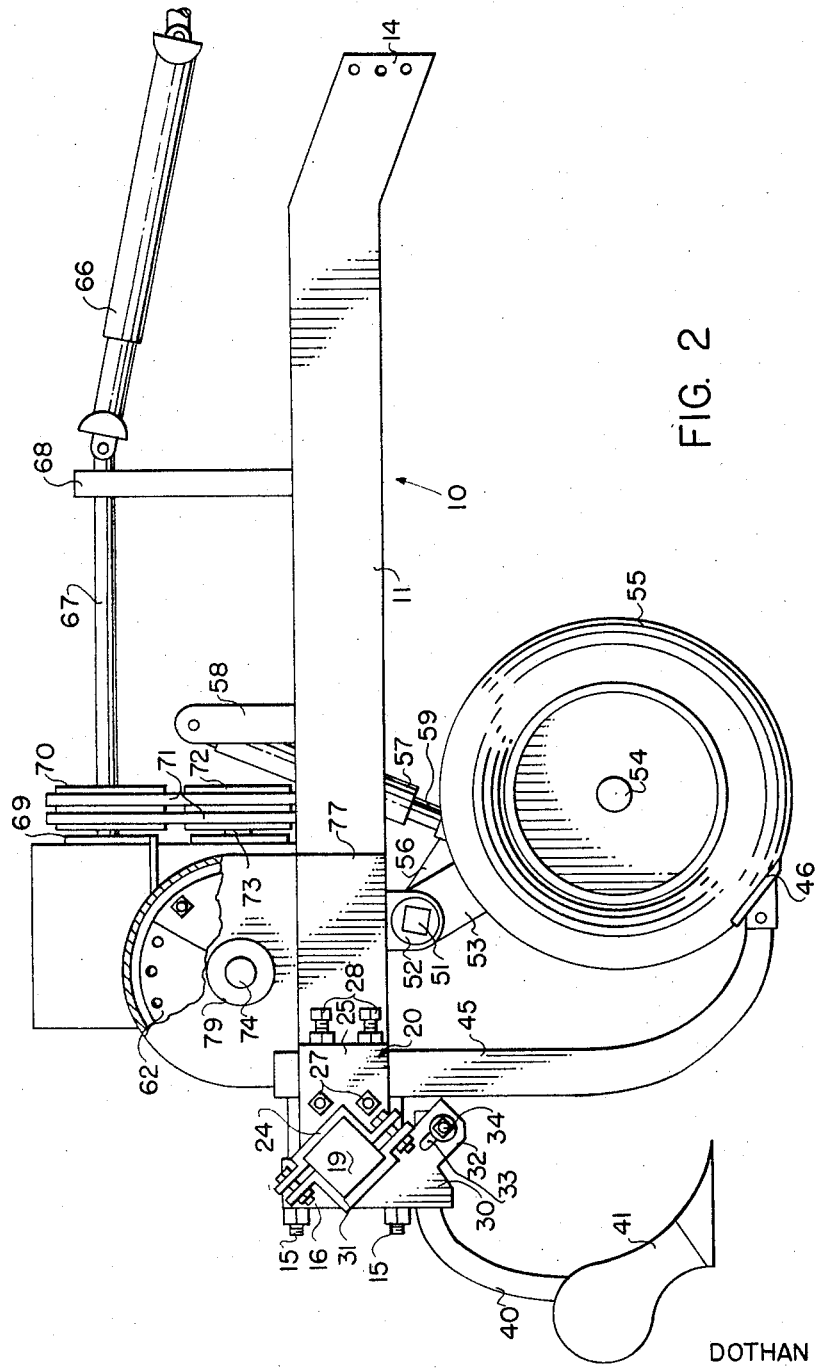
FIG. 2 is a side elevation of the tillage implement shown in FIG. 1, partially broken away.
Figure 3:
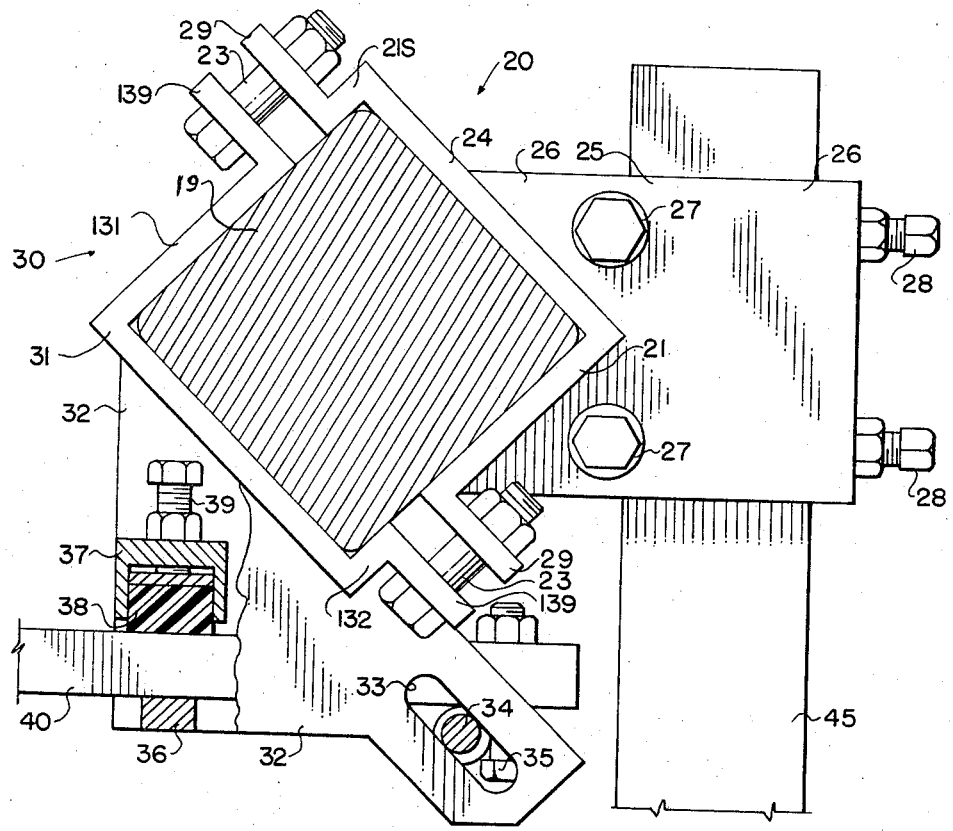
FIG. 3 is a side elevation of the combination tool bar clamp used for supporting tillage tools on the tool bar of the implement with a portion broken away to show details of internal construction.

Referring to the drawings, with particular reference to FIGS. 1 and 2, there is provided a main frame assembly 10 consisting of two matching side frames 11 joined together at spaced intervals by numerous cross braces 12 and 13. The forward end of the frame members 11 are relatively close together and provided with a plurality of matching holes 14 to provide means for hitching the implement to a tractor for draft purposes. The side frames 11 extend rearwardly and have provided thereon clamp bolts 15 which are disposed to receive a clamp cap 16 for the purpose of securing tool bar 19 to the frame.

Mounted on the toll bar 19 in spaced relation are a number of clamps 20 and 30 designed for the support of tool carrying shanks 40 and 45. These clamps are of two distinct designs and are secured in place on the tool bar 19 by means of clamp caps 22 and bolts 23, or they may be locked together in tandem on the tool bar 19 by means of the bolts 23, each clamp serving the other in lieu of the caps 22. The clamp 20 consists of a base plate 24 and a vertically recessed clamp body 25 projecting therefrom and having side flanges 26 which are designed to be brought into frictional engagement with the stem of the tool supporting shank 45 by means of bolts 27 which extend laterally through the flanges 26. The shank 45 is further secured in place by means of set screws 28. On the lower end of the shank 45 is provided means for mounting a tillage point 46.

Long leg 21 is attached to the base plate 24 and contacts an adjacent side of the square tool bar 19. Short leg 21s is attached to the base plate 24 opposite long leg 21. Flanges 29 are at the edges of the long and short legs.

The clamp 30 consists of a base plate 31 and two matching flanges 32 depending therefrom and spaced apart to received the horizontal forward stem of spring shank 40. Matching slots 33 are provided in the forward portion of the flanges 32 through which is passed bolt 34 to support the shackle 35. The spring shank 40 is attached at its forward end to the shackle bolt 35 and extend rearwardly between the depending flanges 32. At the point of emergence from between the flanges 32, the shank 40 is supported from beneath by means of a saddle 36 which is attached between the flanges 32. A bracket 37 is mounted between the flanges 32 and secured thereto, being spaced above the saddle 36 and adapted to receive pressure block 38 made of rubber or other deformable material. The horizontal stem of the shank 40 is passed between the saddle 36 and the pressure block 38, the pressure block being held firmly against the upper face of the shank 40 by means of the set screw 39. The pressure block 38 is intended to provide a cushioned connection between the spring shank 40 and the supporting clamp 30 in order to prevent crystallization and failure of the shank at this point. The shank 40 extends rearwardly and curves downward to support a tillage tool 41 which may be of conventional design such as lister points as shown, or sweeps, shovels, chisels, spikes, or other such devices.

Long leg 131 is attached to the base plate 31 and contacts an adjacent side at the square tool bar 19. Short leg 132 is attached to the base plate 31 opposite the long leg 131. Flanges 139 are at the edges of the long and short legs. One of the bolts 23 passes through the flange 139 on the long leg 131 and flange 29 on the short leg 21s. The other bolt 23 passes through the flange 29 on the long leg 21 and the flange 139 on the short leg 132.

Mounted on the main frame 10, forward of the tool bar 19, is an axle and wheel assembly comprising an axle 51 which is journaled to the frame by means of bearings 52. Attached to the axle 51 are two axle arms 53 which are provided on their forward ends with spindles 54 on which are mounted wheels 55 which serve to support the implement for depth control and transport purposes. Centrally attached to the axle 51 is a lift arm 56 which is attached to hydraulic cylinder 57 by means of plunger 59. The hydraulic cylinder is attached to the frame by means of bracket 58. The hydraulic cylinder is connected by conventional hydraulic flow lines to the hydraulic system of the towing vehicle (not shown) and is controlled thereby for raising and lowering the implement in relation to the ground.

There is mounted on the frame 10 forward of the tool bar 19 an oscillator assembly consisting of a main oscillator rotor 61 and two side oscillator rotors 62 and 63. These oscillators have eccentrically weighted rotors 60 as shown in FIG. 4, which comprise a web 60a and eccentric weights 60b which are secured to the web by means of bolts 60c. The weights 60b may be rotated to any desired segment of the web 60a to give the desired action. The eccentric weights 60b are mounted on the rotors so as to place the centroid eccentric to the center of rotation, and may be shifted in position relative to each other to increase or decrease the eccentricity of the centroid and thereby increase or decrease the force of thrust generated by rotation of the rotors. In FIG. 4 the weights 60b are set in opposite segments of the web 60a to give a balanced rotor, while the rotors 61, 62, and 63 in FIG. 1 have the weights located in the same segment of the web 60a in order to generate an eccentric thrust on rotation of the oscillators. The rotors are geared together by means of bevel gears 64 and 65 and are rotated from the power take off of the towing vehicle through drive mechanism consisting of tumbler shaft 66 attached to drive shaft 67 which is supported by suitable bearings at 68 and 69. Drive pulley 70 is keyed to the drive shaft 67 and by means of belts 71 is caused to drive corresponding pulley 72 which is keyed to shaft 73, which is parallel to the direction of draft. The rotor 61 and the bevel gear 64 are also keyed to the shaft 73. The rotors 62 and 63 are keyed to the outer ends of lateral shafts 74 and 75 respectively, which are parallel to the tool bar and normal to the direction of draft. Bevel gear 65 is keyed to the inner end of each of the shafts 74 and 75. Intermediate the bevel gears 65 and the rotors carried on the shafts 74 and 75 are provided flexible joints 76 for purposes of alignment. The outer rotors 62 and 63 are supported within frame housing 77 which are attached to the tool bar by means of clamps 78. The forward ends of the housings 77 are supported on the outer ends of the axle 51 by means of journal bearings 52a. The rotors 62 and 63 are supported within the housing 77 by means of bearings 79.

An alternate embodiment of the oscillator may be preferred under certain operating conditions wherein the shafts 74 and 75 are joined together and one of the bevel gears 65 is omitted so that both shafts will rotate in the same direction. The eccentric weights on the rotors may be positioned to oppose each other so that one rotor will constantly thrust in a direction opposite to the other, thus producing a complex pattern of oscillation comprising a rocking motion from side to side normal to the direction of the draft, and a lateral side to side motion pivoted about the hitch means and resulting in a side thrust at the tool bar.

Figure 5:
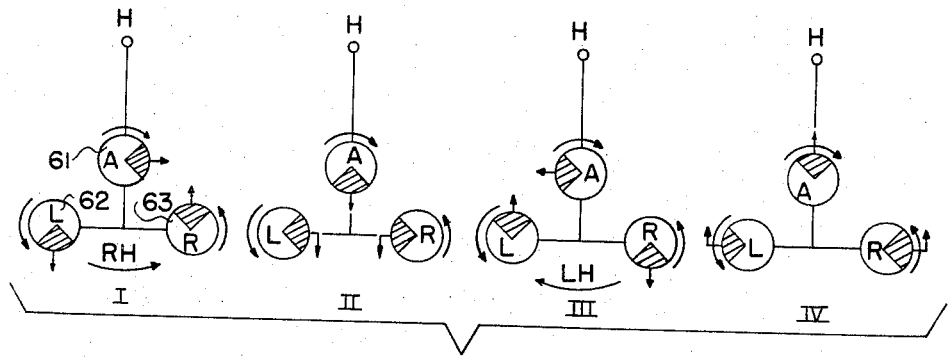
FIG. 5 is a schematic diagram illustrative of the vibrating apparatus showing the three interlocking eccentric rotors in four different positions comprising a complete cycle of operation together with rotational and radial vectors of the forces generated.

Referring to FIG. 5 there is disclosed a schematic diagram showing a complete cycle of operation of the oscillator rotors 61, 62, and 63. The letter H indicates the point of hitch or attachment of the implement to the towing vehicle, which is the pivot point for side thrust generated by the oscillators. The letter A indicated the forward central rotor 61, while the letters L and R indicate the left and right hand side rotors 62 and 63 respectively. The shaded area represents the eccentric weights 60b. The rotational arrows are placed at what would be the top of the respective rotors and indicate the direction of rotation. The arrows attached to the shaded areas of the rotors indicate the thrust vectors. In position I of FIG. 5 the rotors are indicated as being in the position shown in FIG. 1; wherein rotor A has a right hand thrust while rotors L and R have a rearward and forward thrust respectively. The rotors L and R being relatively widely spaced laterally along the tool bar 19 have the effect in this position of accentuating the side thrust of rotor A by tending to swing the implement to the right as indicated by the arrow RH, the frame of the implement pivoting at H.

In position II all of the rotors have turned one-fourth revolution from position I so as to give a unitary downward thrust equal to the combined force of all rotors, imparted to the implement at three relatively widely spaced points along the tool bar 19.

In position III the rotors have turned one-half revolution from position I, giving the implement a left hand thrust as indicated by the arrow LH, the implement pivoting at the point H.

In position IV the rotors have turned one-fourth revolution from position III so as to give a unitary upward thrust equal to the combined force of all rotors.

The complete cycle of operation as here described gives a right hand thrust, a downward thrust, a left hand thrust, and an upward thrust. By adjustment of the weights 60b on the rotors the force of the thrust may be increased or decreased, or shifted to any point on the rotor to give whatever action is desired.

This implement makes possible an improved method of soil tillage. With conventional methods of soil tillage there is developed below the top soil at plow depth an impacted strata of soil, generally referred to as the hardpan. This strata is largely impervious to the passage of water as well as the penetration of plant roots, thereby greatly reducing the productivity of the soil. The fracturing of the hardpan by furrows permits water from natural rainfall as well as irrigation water to pass easily through the hardpan into the subsoil where it is stored for use by growing plants. Also the fracturing of the hardpan permits the penetration of plant roots into the subsoil where they gather moisture and nutrients not otherwise available; thereby greatly increasing the productivity of the soil. With conventional implements and methods of tillage it is necessary to make from two to three passes over the ground being tilled in order to break up the hardpan, and mulch and furrow the top soil. With an implement embodying my invention and the method of tillage as herein disclosed, the subsoil may be broken up and the top soil mulched and listed or furrowed as desired with only one passage of the implement over the ground, thus greatly reducing the cost of tillage and at the same time placing subsoil furrows in register with top soil furrows to facilitate passage of water into the subsoil. Also a subsoil furrow can be placed in perfect register with the seed bed for easy penetration of plant roots into the subsoil.

It will be apparent that the embodiment shown in only exemplary and that various modifications can be made in construction, materials, and arrangement within the scope of the invention as defined in the appended claims.

I claim as my invention:

1. In an earth working implement having
   (a) a tool bar,
   (b) attached to a frame,
   (c) hitch means attached to the frame forward of the tool bar for drawing the frame normal to the tool bar, and
   (d) a plurality of tillage tools attached to the tool bar, the improved means for vibrating the frame and thus the tool bar and the tillage tools comprising:
   (e) two shafts journaled for rotation on the frame parallel to the tool bar,
   (f) an eccentric weight on each shaft near the end of the tool bar, and
   (g) means attached to the shafts for rotating the shafts in opposite directions; so that the eccentric weights cause the tool bar to vibrate in a pivoting motion about the hitch means.
   (gg) at least one of the plurality of tillage tools attached to the tool bar being attached by
   (h) a clamp element having
      (i) a base contacting one side of the tool bar,
      (ii) a short leg contacting a side of the tool bar adjacent the first mentioned side,
      (iii) a long leg contacting a side of the tool bar adjacent the first mentioned side and opposite the short leg, and
      (iv) flanges at the edge of the long and short leg;
   (j) means on the base for attaching said tillage tool to the clamp element;
   (k) a cap having
      (i) a base contacting one side of the tool bar,
      (ii) a short leg contacting a side of the tool bar adjacent the first mentioned side,
      (iii) a long leg contacting a side of the tool bar adjacent the first mentioned side and opposite the short leg, and
      (iv) flanges at the end of the long and short leg;
   (m) a bolt extending from the flange of the long leg of the clamp element through the flange of the short leg of the cap; and
   (n) a second bolt extending from the flange of the long leg of the cap through the flange of the short leg of the clamp element.

2. In an earth working implement having
   (a) a tool bar,
   (b) attached to a frame,
   (c) hitch means attached to the frame forward of the tool bar for drawing the frame normal to the tool bar, and
   (d) a plurality of tillage tools attached to the tool bar;
   the improved means for vibrating the frame and thus the tool bar and the tillage tools comprising:
   (e) a normal shaft journaled for rotation on the frame normal to the tool bar,
   (f) two additional shafts journaled for rotation on the frame parallel to the tool bar,
   (g) an eccentric weight on the normal shaft,
   (h) an eccentric weight on each additional shaft near the end of the tool bar,
   (j) means attached to the normal shaft for rotating it, and
   (k) means interconnecting the normal shaft to the additional shafts for rotating the additional shafts in opposite directions; so that the thrust of the eccentric weights near the end of the tool bar causes the tool bar to vibrate in a pivoting motion about the hitch means.

3. In an earth working implement having
   (a) a tool bar
   (b) attached to a frame
   (c) hitch means attached to the frame forward of the tool bar for drawing the frame normal to the tool bar, and
   (d) earth working tools attached to the tool bar;
   the improved means for vibrating the frame and thus the tool bar and the earth working tools comprising:
   (e) an eccentric rotor mounted for rotation on an axis normal to the tool bar,
   (f) two additional eccentric rotors mounted for rotation on an axis parellel to the tool bar, and
   (g) interconnecting means for rotating the eccentric rotors in phased relation whereby the thrust of the eccentric rotors causes the tool bar to vibrate in both a vertical motion and a pivoting motion about the hitch means.

4. A clamp for attaching at least one plow shank to a square tool bar comprising:
   (a) a clamp element having,
      (i) a base contacting one side of the tool bar,
      (ii) a short leg contacting a side of the tool bar adjacent the first mentioned side,
      (iii) a long leg contacting a side of the tool bar adjacent the first mentioned side and opposite the short leg, and
      (iv) flanges at the edge of the long and short leg;
   (b) means on the base for attaching a plow shank to the clamp element;
   (c) a cap having
      (i) a base contacting one side of the tool bar, (ii) a short leg contacting a side of the tool bar adjacent the first mentioned side,
(iii) a long leg contacting a side of the tool bar adjacent the first mentioned side and opposite the short leg, and
(iv) flanges at the edge of the long and short leg;
(d) a bolt extending from the flange of the long leg of the clamp element through the flange at the short leg of the cap; and
(e) a second bolt extending from the flange of the long leg of the cap through the flange of the short leg of the clamp element.

5. The invention as defined in claim 4 with the addition of:
(f) means on the base of the cap for attaching a plow shank to the cap.

References Cited

UNITED STATES PATENTS

| 2,632,372 | 3/1953 | Williams | 172—142 |
| 2,641,982 | 6/1953 | Harshberger | 172—40 |
| 3,183,979 | 5/1965 | Rogers | 172—40 |
| 3,211,236 | 10/1965 | Patton | 172—40 |
| 3,220,268 | 11/1965 | Brandt | 74—87 |

FOREIGN PATENTS

| 106,589 | 2/1939 | Australia. |

ABRAHAM G. STONE, *Primary Examiner.*

J. R. OAKS, *Assistant Examiner.*